March 22, 1966  J. D. RIGDEN ETAL  3,242,439
VISIBLE OUTPUT GASEOUS OPTICAL MASER WITH MODE PATTERN SELECTOR
Filed June 21, 1962
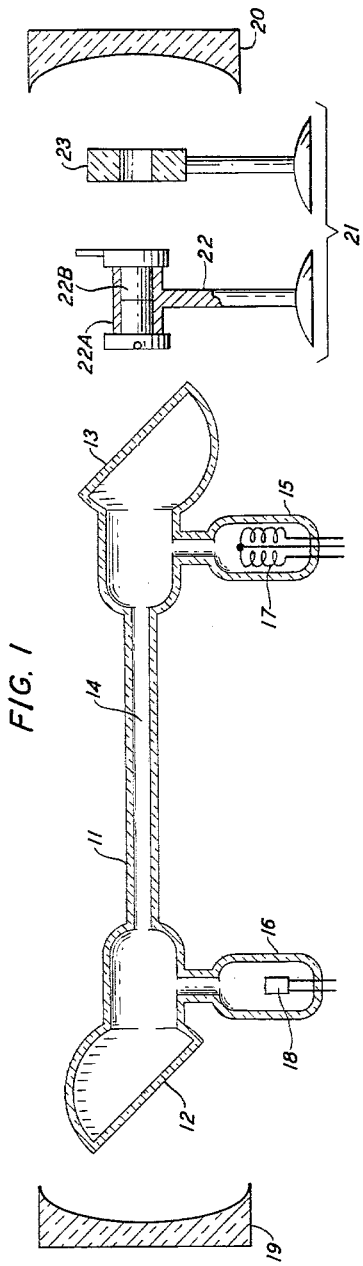
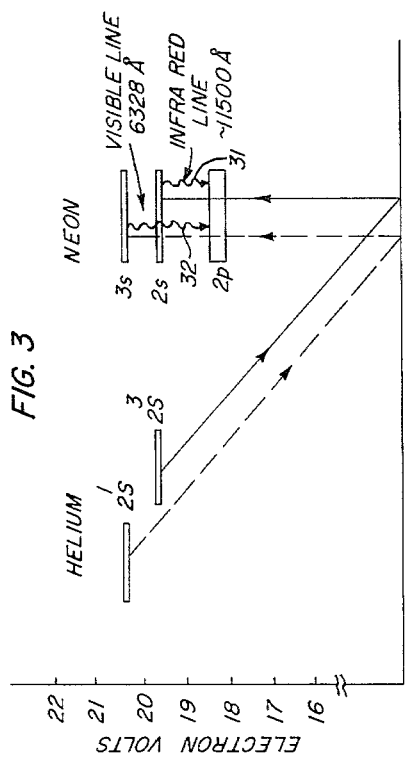
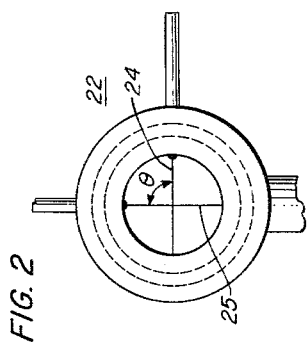
INVENTORS: J. D. RIGDEN
A. D. WHITE
BY
Arthur J. Torsiglieri
ATTORNEY

United States Patent Office 3,242,439
Patented Mar. 22, 1966

3,242,439
VISIBLE OUTPUT GASEOUS OPTICAL MASER
WITH MODE PATTERN SELECTOR
Jameson D. Rigden, New Providence, and Alan D. White, Berkeley Heights, N.J., assignors to Bell Telephone Laboratories, Incorporated, New York, N.Y., a corporation of New York
Filed June 21, 1962, Ser. No. 204,150
6 Claims. (Cl. 331—94.5)

This invention relates to optical masers or lasers, and, more particularly to monochromatic lasers in the visible frequency range.

In an article beginning at page 106 of volume 6 of Physical Review Letters (February 1961) entitled "Population Inversion and Continuous Maser Oscillation in a Gas Discharge Containing a He-Ne Mixture," A. Javan, W. R. Bennett, Jr., and D. R. Herriott, disclose gaseous optical maser action in the 1-micron infrared region. Gaseous optical maser action has not heretofore been demonstrated in the visible frequency range defined for the purposes of this specification as extending between 4000 and 8000 Angstrom units.

It is therefore the object of the present invention to achieve gaseous laser action in the visible portion of the optical spectrum.

One of the important properties of optical masers or lasers is that they are theoretically capable of providing a beam of light which is monochromatic. However, in practice it has been difficult to achieve monochromaticity completely.

A further aspect of the present invention is to increase in an optical maser the degree of monochromaticity achieved. In particular, it has been difficult to achieve monochromaticity in the past because the optical cavity used typically has been capable of supporting a large number of modes, in which the cavity can and does resonate simultaneously in operation. Since these modes typically correspond to slightly different wavelengths and to different transverse energy distributions or mode patterns, the output beam typically comprises light of a number of different wavelengths.

To this end, a feature of the invention is a mode pattern selector which is included in the optical cavity. The mode pattern selector typically comprises a pair of crossed wires serving as light interrupting elements, and advantageously also includes an iris diaphragm.

The isolation of substantially a single mode pattern for oscillation besides permitting a purer output also effectively increases the efficiency of the system for the isolated mode, thereby increasing the output power available at the wavelength corresponding to the isolated mode.

In a preferred embodiment of the invention, a gas mixture consisting of 10 parts helium to 1 part neon with a total pressure of about 0.7 millimeter of mercury and having a cross section of 6 millimeters was included within an optical cavity defined by a pair of dielectric layer mirrors designed to have a peak reflectivity at about 6340 Angstrom units. There was also included a mode pattern isolator comprising a pair of crossed wires and an iris diaphragm. The mixture was ionized by a D.-C. voltage and there resulted maser oscillations at about 6328 Angstrom units, which is in the visible red of the light spectrum. This is believed to be the first gas maser which has operated in the visible portion of the optical spectrum.

The invention will be better understood from the following description taken in conjunction with the accompanying drawing in which:

FIG. 1 shows in schematic form a longitudinal section of an optical maser embodying the invention;

FIG. 2 is a transverse section of the optical maser shown in FIG. 1 showing in more detail the crossed wire mode pattern selector; and FIG. 3 is an energy level diagram helpful in understanding the invention.

With reference now more specifically to the drawing:

FIG. 1 shows an optical maser which comprises an elongated quartz tube 11 enveloping the enclosed space containing the gaseous active medium. A light beam path through the tube 11 is defined by transparent windows 12 and 13 which are inclined at Brewster's angle to the path of light beam 14. By placing the windows at Brewster's angle, light polarized in the plane of incidence is transmitted without reflection. The tube 11 also includes at opposite ends side sections 15 and 16. Side section 15 contains a thoriated tungsten thermionic cathode 17 and side section 16 contains a molybdenum cylinder 18 that serves as an anode. A D.-C. power source (not shown) is connected between cathode 17 and anode 18 for supplying the voltage necessary to maintain a gas discharge along the portion of the envelope extending between the two side sections. Beyond opposite ends of the envelope are positioned reflectors 19 and 20 adjacent the windows 12 and 13, respectively. The reflectors 19 and 20 typically are plano-concave spherical dielectric layer mirrors designed to have a reflectivity peaked at the wavelength desired for the output light.

Positioned intermediate the window 13 and reflector 20 is the mode pattern selector 21 comprising the two-wire assembly member 22 and the iris diaphragm member 23. The reflectors, the envelope and the mode isolator members are all aligned along the light beam path 14 which passes along the axis of the envelope and through the mode isolator.

FIG. 2 is a front view of the crossed wire assembly member 22. It comprises simply a pair of cylinders 22A and 22B aligned end to end as seen in FIG. 1, each of which includes a separate wire 24, 25 extending diametrically across the cylinder. The two cylinders are separately rotatable whereby the angle of intersection $\theta$ as seen in a front view can be varied as desired. Moreover, advantageously, the assembly can be moved in the plane normal to the beam path through the cylinders. Moreover, provision may be made for varying the separation along the beam path of the two cylinders for varying the spacing of the two wires therealong. The wires serve as localized discontinuities interrupting the light along the beam path.

Additionally, the mode pattern selector advantageously includes the iris diaphragm member 23 which is adapted for varying the size of the iris or opening. This simply can be a member similar to the type used in controlling the size of the lens aperture in a conventional camera. Additionally, it is advantageous to make the position of the iris opening adjustable in the plane normal to the direction of the light path through the iris.

FIG. 3 is an energy level diagram illustrating several relationships in a helium-neon gas mixture. It is characteristic of helium that its energy level system includes a large number of levels, only a small relevant portion of the system being shown in FIG. 3. The infrared transition at ~11,500 Angstroms from the $2s$ to $2p$ levels in neon, made possible by energy transfer from the metastable $2^3S$ state of helium, is indicated by the shorter wavy line 31. This transition was first reported by Javan, Bennett, and Herriott in the Physical Review Letters article mentioned hereinbefore. The present invention is based on the discovery that the transfer of energy from helium atoms in the $2^1S$ metastable state to neon atoms, thereby raising the latter to one of the $3s$ states, produces a population inversion which, upon relaxation to one of the $2p$ states, emits coherent visible energy at 6328 Angstroms. This emission is indicated by longer wavy line 32.

The arrangement described has been used successfully to produce continuous maser oscillation at 6328 Angstrom units corresponding to the $3s_2$–$2p_4$ transition in neon. In this maser, the active medium was a helium-neon mixture with a helium-neon ratio of 10 to 1 and a total pressure of about 0.7 millimeter of mercury. The two reflectors were spaced about 150 centimeters apart and each reflector was a thirteen layer dielectric mirror designed to have a peak reflectivity at about 6340 Angstrom units. The radius of curvature of the spherical surface of each reflector was 100 centimeters. A voltage of about 1700 volts was set up between the cathode and anode and a current of about 30 milliamperes flowed therebetween. The constricted portion of the tube extending between the two side sections had a length of 85 centimeters and an inner diameter of 6 millimeters. The crossed wires each had a diameter of 1 mil. With the exception of the peak reflectivity of the mirrors, considerable variation in the parameters is tolerable.

Basically, the mode pattern selector reduces the number of transverse energy distributions that the optical cavity will support efficiently. The only transverse modes supported will be those which have nulls at the places where the light interrupting elements are located in the light path. By reducing the number of such modes that is supported, there is reduced the number of oscillatory modes that are excited with a consequent improvement in the purity of the resulting light and also an increase in the power output associated with the modes that are excited.

It should be evident to a worker in the art that the mode isolation principles described are not limited to the specific gas maser embodiment described but rather are independent of the nature of the negative temperature medium and of the type of optical cavity employed.

Moreover, for increased mode isolation, it is feasible to add still additional light interrupting or absorptive elements in the light path within the optical cavity. In particular, there may be included along the light path an additional partially reflective element in accordance with the teaching of copending application Serial No. 145,087 filed Oct. 16, 1961, by P. P. Kisliuk and D. A. Kleinman, assigned to the assignee of this application. This application issued as United States Patent 3,134,837 on May 26, 1964.

What is claimed is:

1. In an optical maser, a pair of reflective mirrors defining an optical cavity having a peak reflectivity at about 6340 Angstrom units whereby said optical maser is selectively operative at about 6328 Angstrom units; and means within said cavity enclosing a helium-neon mixture with a helium-neon ratio of about 10 to 1, a helium-neon pressure of about 0.7 millimeter of mercury, and a cross section of about 6 millimeters.

2. An optical maser in the visible frequency range comprising means defining an optical cavity, a negative temperature medium with a diameter of about 6 millimeters comprising a helium-neon mixture with a helium-neon ratio of about 10 to 1 and a total pressure of about 0.7 millimeter of mercury within said optical cavity for establishing a radiated light beam therewithin, and means for isolating oscillatory modes of said cavity comprising a pair of crossed light interrupting elements positioned within said cavity in the path of said beam, said means defining the optical cavity comprising reflectors having peak reflectivity at about 6340 Angstrom units whereby said radiated light beam is selectively established at 6328 Angstrom units.

3. In an optical maser providing visible coherent radiation in a frequency range including 6328 Angstrom units, an optical cavity containing an active material comprising a mixture of helium and neon gases confined under pressure in an enclosure having a diameter and a length suitable for laser action in said visible frequency range, said cavity comprising a pair of mirrors having a peak reflectivity at about 6340 Angstrom units whereby said radiation is selectively emitted at 6328 Angstrom units.

4. The maser according to claim 3 in which said energy levels are $3s_2$ and $2p_4$ and said peak reflectivity is substantially at 6340 Angstrom units.

5. In combination with the maser according to claim 3, a pair of crossed energy interrupting elements positioned within said cavity in the path of said coherent radiation.

6. An optical maser comprising an optical cavity containing a mixture of helium and neon gases confined under pressure in an enclosure having a diameter and a length suitable for laser action in a visible frequency range including 6328 Angstrom units, means for establishing a population inversion between the $3s$ and $2p$ energy levels of the neon gas in said mixture, and means for stimulating emission of coherent radiation from said medium at a wavelength corresponding to the energy separation between a $3s$ and a $2p$ level, said stimulating means comprising energy reflectors forming the boundaries of said cavity and having a peak reflectivity in said visible frequency range whereby said radiation is selectively emitted at said wavelength.

References Cited by the Examiner
UNITED STATES PATENTS 2,476,034    7/1949    Fox _____ 333—83 X

OTHER REFERENCES

Electronic Design: "IR Maser Offers First CW Source of Coherent Light," volume 9, Feb. 15, 1961, pages 20 and 21.

Rigrod et al.: "Gaseous Optical Maser with External Concave Mirrors," volume 33, Journal of Applied Physics, February 1962, pages 743 and 744.

Schawlow et al.: "Infrared and Optical Masers," Physical Review, volume 112, No. 6, Dec. 15, 1958, pages 1940 to 1949.

JEWELL H. PEDERSEN, *Primary Examiner.*